United States Patent
Aggarwal et al.

(10) Patent No.: US 11,727,934 B2
(45) Date of Patent: *Aug. 15, 2023

(54) DIRECTING A VEHICLE CLIENT DEVICE TO USE ON-DEVICE FUNCTIONALITY

(71) Applicant: GOOGLE LLC, Mountain View, CA (US)

(72) Inventors: Vikram Aggarwal, Palo Alto, CA (US); Vinod Krishnan, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,563

(22) Filed: Apr. 25, 2022

(65) Prior Publication Data
US 2022/0246152 A1 Aug. 4, 2022

Related U.S. Application Data

(63) Continuation of application No. 16/613,005, filed as application No. PCT/US2019/017639 on Feb. 12, 2019, now Pat. No. 11,315,559.

(51) Int. Cl.
*G10L 15/22* (2006.01)
*G10L 15/183* (2013.01)
*G10L 15/26* (2006.01)

(52) U.S. Cl.
CPC ............ *G10L 15/22* (2013.01); *G10L 15/183* (2013.01); *G10L 15/26* (2013.01)

(58) Field of Classification Search
CPC ....... G10L 15/183; G10L 15/22; G10L 15/26; G10L 2015/223; G10L 2015/228
See application file for complete search history.

(56) References Cited

U.S. PATENT DOCUMENTS 7,155,462 B1 12/2006 Singh et al.
7,386,617 B2 6/2008 Apte et al.
(Continued)

FOREIGN PATENT DOCUMENTS

JP 2005300989 10/2005
JP 2010091963 4/2010
(Continued)

OTHER PUBLICATIONS

European Patent Office; International Search Report and Written Opinion of Ser. No. PCT/US2019/017639; 20 pages; dated Jan. 14, 2020.
(Continued)

*Primary Examiner* — Angela A Armstrong
(74) *Attorney, Agent, or Firm* — Gray Ice Higdon

(57) ABSTRACT

Implementations set forth herein relate to phasing-out of vehicle computing device versions while ensuring useful responsiveness of any vehicle computing device versions that are still in operation. Certain features of updated computing devices may not be available to prior versions of computing devices because of hardware limitations. The implementations set forth herein eliminate crashes and wasteful data transmissions caused by prior versions of computing devices that have not been, or cannot be, upgraded. A server device can be responsive to a particular intent request provided to a vehicle computing device, despite the intent request being associated with an action that a particular version of the vehicle computing device cannot execute. In response, the server device can elect to provide speech to text data, and/or natural language understanding data, in furtherance of allowing the vehicle computing device to continue leveraging resources at the server device.

12 Claims, 7 Drawing Sheets

(56) References Cited

U.S. PATENT DOCUMENTS

| | | | |
|---|---|---|---|
| 7,698,131 | B2 | 4/2010 | Bennett |
| 8,788,569 | B2 | 7/2014 | Griffiths et al. |
| 10,630,808 | B1 | 4/2020 | Watt et al. |
| 11,315,559 | B2 * | 4/2022 | Aggarwal ............... G10L 15/22 |
| 2018/0039477 | A1 | 2/2018 | Sung et al. |
| 2020/0192684 | A1 | 6/2020 | Woo et al. |
| 2020/0342863 | A1 | 10/2020 | Aggarwal et al. |

FOREIGN PATENT DOCUMENTS

| | | |
|---|---|---|
| JP | 2019003677 | 1/2019 |
| WO | 2018199483 | 11/2018 |
| WO | 2019013316 | 1/2019 |
| WO | 2020167294 | 8/2020 |

OTHER PUBLICATIONS

European Patent Office; Invitation to Pay Additional Fees, Ser. No. PCT/US2019/017639; 13 pages; dated Nov. 7, 2019.
Intellectual Property India; Examination Report issued in Application No. IN202127030139; 7 pages; dated Mar. 15, 2022.
Japanese Patent Office; Notice of Allowance issued in App. No. 2021-542172, 3 pages, dated Sep. 5, 2022.

* cited by examiner

DIRECTING A VEHICLE CLIENT DEVICE TO USE ON-DEVICE FUNCTIONALITY

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Automated assistants can be installed at a variety of different devices such as, for example, mobile phones, smart home devices, and/or vehicles. Unlike mobile phones, and other computing devices, a vehicle can often be utilized for an extended period of time (e.g., ten or more years) by a respective owner before the owner eventually decides to purchase a replacement vehicle. During this time period of ownership of the vehicle, software that is installed at vehicle can be subject to updates. For example, updates can be provided to a vehicle computing device in order to allow a vehicle computing device to be responsive to commands that newer smart home devices and/or newer mobile phone can handle. However, a user may choose to not install certain updates, leading to incompatibility between the vehicle computing device and a remote server device with which the vehicle computing device interacts in responding to a command. Also, after a period of time (e.g., three or more years), updates may no longer be provided for the vehicle computing device due to for example, end of support life, inability of hardware of the vehicle computing device to execute new updates, and/or other factor(s). This can also lead to incompatibility between the vehicle computing device and the remote server device. When the vehicle computing device and the remote server device become incompatible, the server device may respond to requests, from the vehicle computing device, that are no longer interpretable by the vehicle computing device. This can lead to the vehicle computing device failing to appropriately respond to various commands, and leads to the vehicle computing device wastefully transmitting various data to the server device and/or the server device wastefully transmitting various data to the vehicle computing device (since some server device response(s) will no longer be interpretable by the vehicle computing device). Some techniques attempt to address this problem by having the server device be compatible with most recent updates, as well as with prior versions of vehicle computing devices. However, to provide such backwards compatibility indefinitely can require extensive storage, memory, and/or processor usage at the server device.

SUMMARY

Implementations set forth herein relate to techniques for processing spoken utterances received at vehicle computing devices that—although including operable software-correspond to a version that is subject to a gradual phasing-out by the server device, and/or any other supporting system. The gradual phasing out can result in a spectrum of support for various server operations for versions of hardware and/or software. These server operations can include, but are not limited to, speech-to-text processing, natural language understanding (e.g., intent identification and/or slot value identification), action generation, and/or action execution. The server device can operate to gradually phase out performance of one or more of the operations over time, based on a version of hardware and/or software becoming outdated relative to other, newly released hardware and/or software. As a result, particular operations, such as generating actions and/or slot values, for particular versions can be exclusively performed locally as a result of those particular versions being subject to a phasing-out. In this way, computing devices that are typically operated longer than most others (e.g., vehicle computing devices) can nonetheless receive some amount of support from a server device for longer periods of time, despite not corresponding to a latest version.

For instance, a spoken utterance can include natural language content that the user typically uses to control another one of their devices, such as a smart home device and/or a mobile phone, and the natural language content can specify a requested intent. When the vehicle computing device corresponds to a current version being supported by the server device, the vehicle computing device can transmit the spoken utterance to the server device. In response, the vehicle computing device can receive, from the server device in one or more transmissions, data that specifies: text converted from the spoken utterance, one or more intents determined based on the text, one or more slot values for one or more respective intents, and/or one or more actions for the one or more intents. In some implementations, a slot for an intent and/or an action can refer to a required or optional parameter that is referenced when executing an operation according to the intent and/or the action. Furthermore, a slot value can be a value that is assigned to a particular slot of an intent and/or an action. For instance, an intent such as a message intent can include a slot for specifying a recipient of a message, and a slot value can be name (e.g., John Smith) and/or a phone number (e.g., 555-555-1234).

As described in detail herein, the particular data that is provided by the server device, when the vehicle computing device corresponds to a current version, can be dependent upon the type of spoken utterance, which can be derived from text of the spoken utterance and/or the intent(s) determined based on the text. Moreover, which data (if any data) is provided in response to a particular type of spoken utterance, can vary dynamically over time as the version of the vehicle computing device is no longer a current version fully supported by the server device. For example, if the vehicle computing device corresponds to a version that is not a most current version, the server device can, regardless, at least perform speech-to-text processing of audio data corresponding to the spoken utterance to generate textual data. The textual data can optionally be provided to and utilized by the vehicle computing device. However, the server device may not provide any further data, instead instructing the vehicle computing device to rely on its own local engines (e.g., local NLU engine, local action engine) in furtherance of satisfying spoken utterance—as opposed to exclusively issuing an error to the user (e.g., "Please update your device."). In this way—although the vehicle computing device can have the ability to locally convert the spoken utterance to textual data—the vehicle computing device can still leverage the processing capabilities of the server device to obtain a better speech to text conversion despite the server no longer completely supporting to the version of the vehicle computing device.

In some implementations, the server device can transmit the textual data to the vehicle computing device along with instructions for the vehicle computing device to no longer transmit similar intent requests to the server device. For instance, the vehicle can include a subsystem, which can be controllable via an automated assistant for users that are operating a second version of the vehicle computing device, but not controllable via an automated assistant for users that are operating a first version of the vehicle computing device. The subsystem can be, but is not limited to, a network of fluid sensors that are connected to the vehicle computing device. The user can request that the vehicle computing device fulfill a particular intent associated with the network of three fluid sensors by providing a spoken utterance such as, "Assistant, send the body shop my fluid sensor readings." The server device can process audio data corresponding to the spoken utterance and, based on the audio data and version information, determine that an action (e.g., retrieving data from four fluid sensors) corresponding to the intent is only supported by later versions (e.g., the second version) of the vehicle computing device. For instance, an action supported by a most recent version of the vehicle computing device can include action syntax for sampling output signals from four different fluid sensors. Therefore, if a vehicle computing device having only three fluid sensors receives the aforementioned action, the syntax of the action can cause the vehicle computing device to fail or otherwise perform inconsequential tasks in furtherance of executing the incorrect action. In response to the server device receiving the audio data and version information from the vehicle computing device, the server device can generate instructions and/or data for providing to the vehicle computing device in order to cause the vehicle computing device to no longer transmit audio data corresponding to similar types of intent requests to the server device. Rather, using these instructions, when the vehicle computing device determines that the user is requesting a similar type of intent request, the vehicle computing device can locally generate action data for the requested intent. This can preserve computational resources and network resources, as the server device would no longer be processing audio data for intent requests that correspond to those actions that certain vehicle computing devices cannot execute because of hardware and/or software version limitations.

In some implementations, audio data corresponding to a spoken utterance from a user can be processed at both the vehicle computing device and the server device. However, when the vehicle is able to determine an intent being requested by the user, the vehicle computing device can be responsive to the intent request when the server device has previously requested the vehicle computing device handle such intents. Furthermore, the vehicle computing device can operate in furtherance of generating an action for the intent, without further assistance from the server device, despite there being a network connection for allowing the vehicle computing device to communicate with the server device. In some implementations, when the vehicle computing device has not received instructions to no longer involve the server device in assisting with performance of certain intents, the vehicle computing device can still leverage certain capabilities of the server device despite the server device not supporting all features of a particular version of hardware and/or software of the vehicle computing device.

As an example, the user can provide a spoken utterance in furtherance of an intent that uses information about a particular subsystem of the vehicle. The spoken utterance can be, "Assistant, when do I need to buy new tires?" When the vehicle computing device has a network connection with the server device, audio data corresponding to the spoken utterance can be transmitted to the server device for processing. In response to receiving the audio data, the server device can determine an intent being requested by the user, as well as a version associated with the vehicle computing device. Based on the version of the vehicle computing device, the server device can determine that certain requests, corresponding to tire tread sensors and the version of the computing device, are no longer supported by the server device, and therefore the server device will not generate intent data in response to determining the intent and version. For instance, if the user had the latest version of the computing device, the server device would generate data that characterizes the intent, and an action and/or slot value(s) to cause the automated assistant at the vehicle computing device to provide an estimate of when the user should replace their tires based on sensor output of their tire sensors (e.g., "You should change your tires in about 2 months, or in about 1600 miles.").

However, because the vehicle computing device does not correspond to a fully supported version, the server device can provide natural language content and/or other data that is based on the server device processing the audio data. For example, the server device can provide derived request data to the vehicle computing device, and the derived request data can at least characterize the natural language content of the spoken utterance (e.g., "Assistant, when do I need to buy new tires?") and/or provide a message requesting that the user update their device. In response to receiving the vehicle computing device, the vehicle computing device can provide a message to assist the user (e.g., a message to the user can include: "Please update your vehicle computing device to receive access to all Assistant actions."). Furthermore, the vehicle computing device can locally generate a suitable action to execute in furtherance of fulfilling the requested intent from the user. For instance, the locally determined action can correspond to searching the internet (e.g., "WEB_SEARCH_ACTION( )"), whereas the action that would be determined via a most current version of the vehicle computing device can correspond to at least retrieving and presenting data from a subsystem of the vehicle (e.g., "TIRE_LIFETIME_ESTIMATE_ACTION( )").

As an example, the vehicle computing device can receive the derived request data and, because the vehicle computing device has a network connection, perform an action (e.g., "WEB_SEARCH_ACTION( )") of performing an internet search using the phrase: "When do I need to buy new tires?" Based on the internet search, the automated assistant can provide a natural language output via an interface of the vehicle computing device, rather than providing an error or exclusively indicating an inability of the vehicle computing device to perform the requested action. For example, based on the internet search, the automated assistant can provide an audible natural language output such as, "Some sources say you should change your tires every 5 years or every 50,000 miles." In this way, apparatuses such as vehicles, which users have an interest in operating for many years, can maintain particular functionality despite certain versions of those apparatuses being partially or completely unsupported by a manufacturer or other service provider (e.g., an entity maintaining a corresponding and supporting server device).

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates a method for phasing-out support for particular computing device requests while ensuring useful responsiveness to any request a computing device has previously been responsive to.

DETAILED DESCRIPTION

Figure 1A:
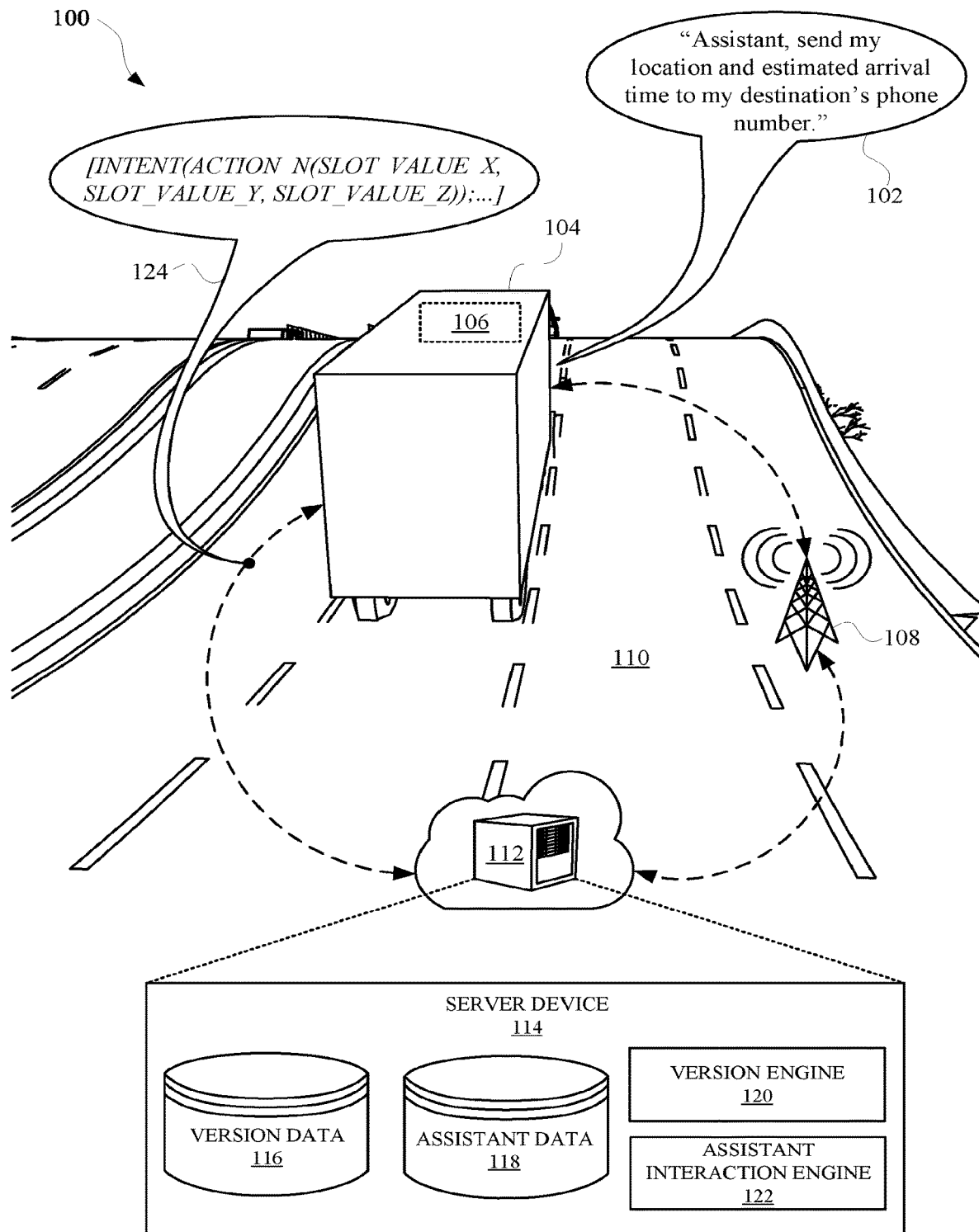
FIG. 1A, FIG. 1B, and FIG. 1C illustrate views of a server device that is responsive to various computing devices despite the server device actively phasing-out certain versions of the computing devices.
Figure 1B:
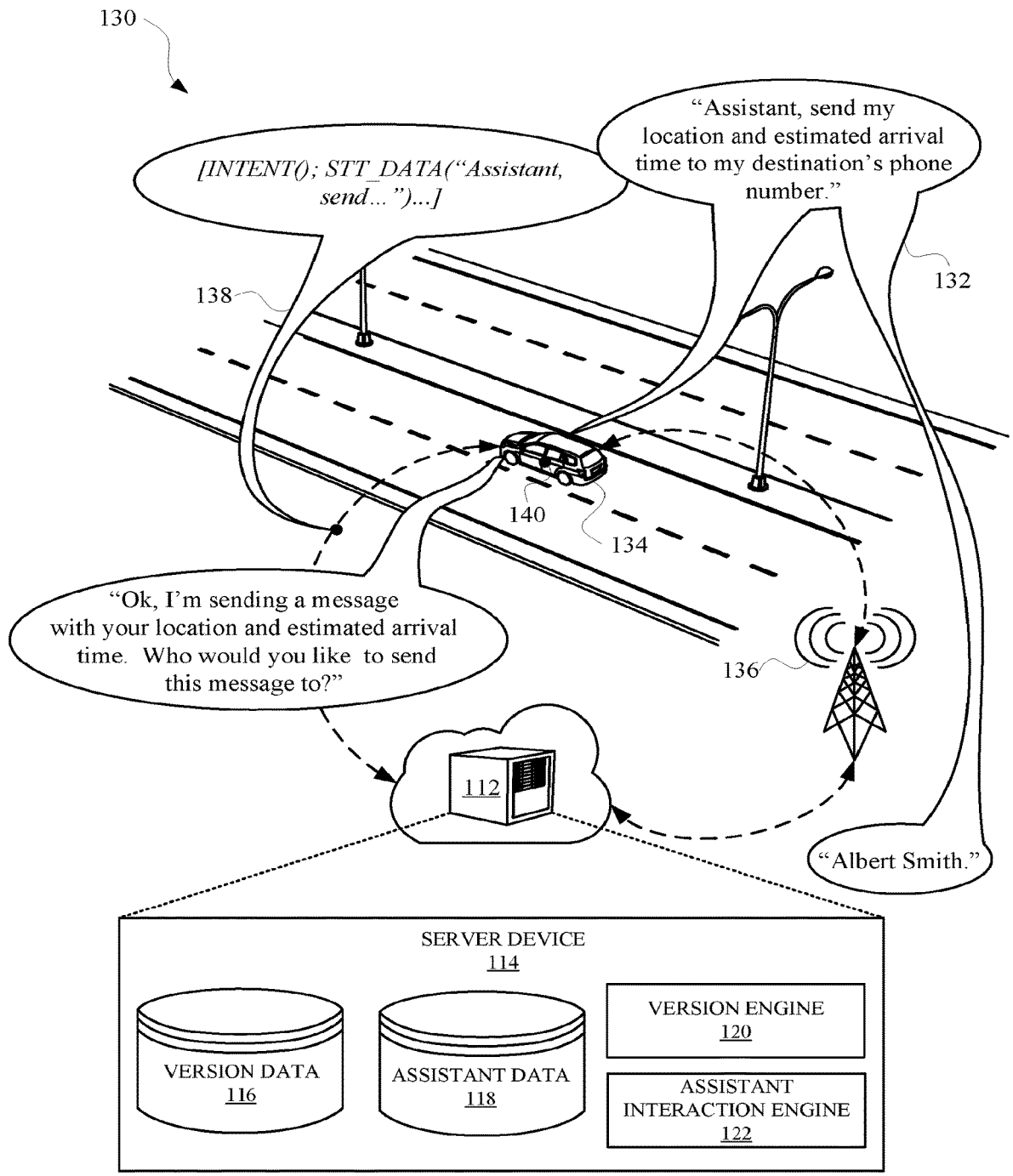
Figure 1C:
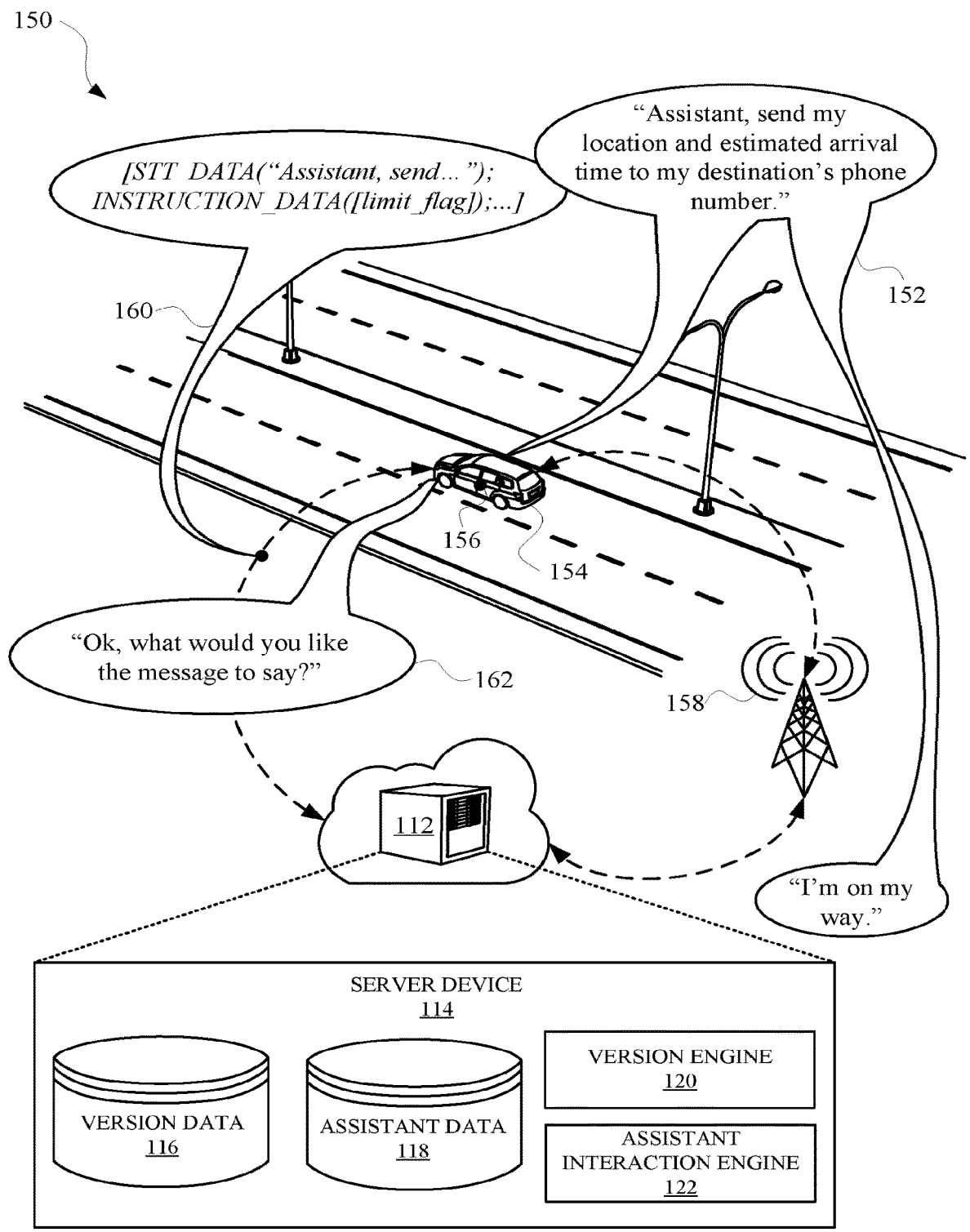

FIG. 1A, FIG. 1B, and FIG. 1C illustrate views 100, 130, and 150 of a server device 114 that is responsive to various vehicle computing devices despite the server device 114 actively phasing-out support of certain versions of the vehicle computing devices. Specifically, FIG. 1A illustrates a vehicle computing device 106 that is completely supported by a remote computing device 112, such as the server device 114. In other words, a version of one or more software and/or hardware components of the vehicle computing device 106 can correspond to a most recently available version. As an example, the vehicle computing device 106 can correspond to a third version, and other previously available versions can include a first version and a second version. The server device 114 can operate to provide some amount of support to each version, despite the third version being the most recent version, in order to eliminate wasteful transmissions and/or operations at other vehicle computing devices that are operating according to the first version or the second version.

As provided in FIG. 1A, a user can provide a spoken utterance 102 such as, "Assistant, send my location and arrival time to my destination's phone number." The spoken utterance can correspond to an action that is exclusively executable at vehicle computing devices operating according to the third version. Therefore, because the vehicle computing device 106 of vehicle 104 corresponds to the third version, the server device 114 can operate to be completely responsive to the request from the user. In some implementations, the request from the user can correspond to an intent that is the same for all versions (e.g., a first version, a second version, and a third version), but a particular action for the requested intent can be different depending on the version that is associated with the vehicle computing device receiving the request. In other words, an identifier used for the intent can be common for all versions of a software and/or a hardware module. For example, an intent requested via the spoken utterance 102 can be identified as a MESSAGE_INTENT( ). However, actions that can be executed in accordance with the intent can be different per version, and/or syntax for each action can be different per version. For instance, a MESSAGE_DESTINATION( ) action can available for all version of vehicle computing devices, however, particular syntax of the MESSAGE_DESTINATION( ) action can be different for a third version, at least relative to a first version. As an example, action syntax for the third version can reference attributes, values, APIs, and/or any other data that is not referenced by the action syntax for the same action of the first version.

In some implementations, the vehicle computing device 106 can rely on the server device 114 to select a particular action for execution at the vehicle computing device 106. The vehicle computing device 106 can locally determine whether to rely on the server device 114 for selecting an action, or determine the action locally. For example, because the vehicle computing device 106 corresponds to the third, and latest version, a vehicle computing device 106 can determine that the server device 114 can provide action data and/or slot value data when the user is requesting a particular intent. In response to the user providing a request for the message intent, the vehicle computing device 106 can perform speech to text processing on the spoken utterance 102, and/or can provide audio data corresponding to the spoken utterance 102 to the server device 114 for processing. The audio data can be transmitted over a network 108, such as the internet, via a wireless communication protocol such as cellular, 4G, 5G, LTE, Bluetooth, Wi-Fi, one or more long range protocols, and/or any other wired or wireless communication protocol.

In response to the server device 114 receiving the audio data, the server device 114 and/or another device in communication with the server device 114, can perform speech to text processing on the audio data. Resulting textual data derived from the speech-to-text processing can characterize natural language content of the spoken utterance 102. In some instances, the user may provide a spoken utterance 102 that includes one or more natural language terms specifically generating and/or identifying a particular intent. For example, the message intent can be identified using natural language terms such as send, message, draft, and/or any other natural language term(s) that can be associated with an electronic message. The textual data can be stored at the server device 114 as assistant data 118, and can be further processed via an assistant interaction engine 122 to generate natural language understanding (NLU) data corresponding to the textual data. In some implementations, by generating the NLU data, the assistant interaction engine 122 can identify the intent requested by the user via the spoken utterance 102.

In some implementations, when the vehicle computing device 106 receives a spoken utterance from the user, the vehicle computing device 106 can transmit audio data corresponding to the spoken utterance, along with version data, to the server device 114. In response to receiving the version data, a version engine 120 of the server device 114 can determine a version corresponding to the vehicle computing device 106. In some implementations, the version can be based on one or more hardware components of the vehicle computing device 106, one or more software modules operating at the vehicle computing device 106, an automated assistant that is accessible via the vehicle computing device 106, and/or any other characteristic that can be associated with the vehicle computing device 106.

Based on identifying the requested intent and version corresponding to the vehicle computing device 106, the server device 114 can generate a suitable action for the vehicle computing device 106 to execute. Alternatively, or additionally, the server device 114 can also identify one or more slot values for the intent, which can be used during generation of the identified action. The server device 114 can use version data 116 in order to identify one or more actions that can be executed using the vehicle computing device 106. For example, the third version corresponding to the vehicle computing device 106 can support retrieving application data from different applications in order to generate slot values for a message. Therefore, because the user requested that their location and arrival time be sent to a phone number associated with their destination, the server device can access, with user permission, other application data that identifies a current location (e.g., "SLOT_VALUE_X"), an estimated arrival time (e.g., "SLOT_VALUE_Y"), and a phone number (e.g., "SLOT_VALUE_Z") that is associated with a destination for the user. An action corresponding to this type of message can be identified as, for example, a multi-source message action (e.g., "ACTION_N"). This particular action can be selected by the server device 114 for execution at the vehicle computing device 106, at least when the vehicle computing device 106 corresponds to the third version.

Therefore, in response to the vehicle computing device 106 receiving the spoken utterance 102, and the vehicle computing device 106 providing the audio data and version data to the server device 114, the server device 114 can provide intent data 124 to the vehicle computing device 106. The intent data 124 can identify the intent (e.g., "INTENT( )"), the server selected action (e.g., "ACTION_N"), and any slot values that have been identified by the server device 114 based on the spoken utterance 102 and/or any other suitable source of data. However, when a vehicle computing device does not correspond to the third version, the server device 114 and/or the vehicle computing device can handle a similar spoken utterance differently, but in a way that ensures responsiveness of an automated assistant, or another application, to the spoken utterance.

In various implementations, the vehicle computing device 106 is integrated with the vehicle and directly drives vehicle speaker(s) that are also integrated with the vehicle. The vehicle computing device 106 can be original equipment of the vehicle, or can be an after-market installed accessory. The vehicle computing device 106 is integrated in that it drives vehicle speaker(s) directly and/or cannot be removed from the vehicle without requiring usage of special tools and/or requiring significant time and/or expertise. For example, the vehicle computing device 102 can be connected to a controller area network (CAN) bus of the vehicle and/or can be powered via vehicle-specific connectors (e.g., not a 12 V vehicle receptacle and not a readily accessible auxiliary standard plug).

FIG. 1B illustrates a view 130 of a user providing a spoken utterance 132 to a vehicle computing device 140 that corresponds to a second version. The vehicle computing device 140, and/or any other vehicle computing device discussed herein, can include one or more memory devices and one or more processors. In response to receiving the spoken utterance 132, the vehicle computing device 140 can communicate with the remote computing device 112 via a network 126, such as the Internet. The spoken utterance 132 can be similar to the spoken utterance 102 of FIG. 1A, at least in order to illustrate differences and how the server device 114 can handle similar spoken utterances for different versions.

For example, because the vehicle computing device 140 corresponds to the second version, and the third version is the latest version, the server device 114 can respond to the vehicle computing device 140 differently, at least relative to the response illustrated in FIG. 1A. The vehicle computing device 140 can communicate audio data, which characterizes the spoken utterance 132, as well as version data, which characterizes the vehicle computing device 140 as corresponding to the second version. In some implementations, the vehicle computing device 140 can locally determine an extent to which the server device 114 can assist the vehicle computing device 140 in responding to a particular intent request embodied by the spoken utterance 132. Additionally, or alternatively, the server device 114 can determine an extent to which the server device 114 can assist the vehicle computing device in responding to the particular intent request, at least based on version data 116 that is accessible to the server device 114. The vehicle computing device 140 can provide the audio data and the version data to the server device 114 in response to determining that the spoken utterance 132 embodies an intent request corresponding to a MESSAGE_INTENT, and that the second version of the vehicle computing device 140 is at least partially supported with respect to the MESSAGE_INTENT.

As an example, the server device 114 can receive the audio data and the version data, and version engine 120 can determine an extent to which the server device 114 can support the vehicle computing device 140 having the second version. The version engine 120 can compare version data from the vehicle computing device 140 with the version data 116 in order to generate data characterizing an extent to which the server device 114 can support the vehicle computing device 140. Alternatively, or additionally, the server device 114 can access textual data characterizing natural language content of the spoken utterance 132 in order to generate natural language understanding data for the spoken utterance 132. An assistant interaction engine 122 can use the textual data to generate NLU data, which characterizes the MESSAGE_INTENT, and optionally, one or more slot values for fulfilling the intent request. In some implementations, the intent and/or one or more slot values can be generated based on assistant data 118, which is accessible to the server device 114.

Based on server device 114 determining that the vehicle computing device 140 corresponds to the second version, the server device 114 can transmit data 128 to the vehicle computing device, and the data 128 can identify the intent (e.g., INTENT( )) and speech to text data (e.g., STT_DATA ("Assistant, send . . . "), which can characterize natural language content of the spoken utterance 132. By providing the speech to text data, despite the vehicle computing device 140 corresponding to the second version and not the third version, computational resources can be preserved at the vehicle computing device 140, should any local processing of the spoken utterance 132 remain ongoing. Furthermore, by allowing the server device 114 to bypass transmitting action data corresponding to the third version, network bandwidth can be preserved, as less data is transmitted via the network 126. Furthermore, if the vehicle computing device 140 had received action data corresponding to the third version and attempted to process it, such processing would have been inconsequential, at least with respect to furthering fulfillment of the message intent.

When the vehicle computing device 140 receives the data 128, the vehicle computing device 140 can locally select a suitable action for the intent. For example, instead of identifying and/or generating the multi-source action intent, the vehicle computing device 140 can identify an action that is supported by one or more applications accessible via the vehicle computing device 140. For example, the vehicle computing device 140 can generate a LOCATION_MESSAGE action that is capable of being performed by a map application, with assistance from the automated assistant. For example, slot values for the LOCATION_MESSAGE action can include a current location and an estimated arrival time, which can be generated by the map application. However, because the vehicle computing device 140 corresponds to the second version, the vehicle computing device 140 may not be able to support an application that can provide a phone number for a mapped destination. Therefore, in response to the spoken utterance 132 and based on the data 128, the automated assistant can provide a response 142 such as, "Ok, I'm sending a message with your location and estimated arrival time. Who would you like to send this message to?" In response, and in order to fulfill a remaining slot value, the user can provide another spoken utterance 132 such as, "Albert Smith." When all the slot values for the LOCATION_MESSAGE action have been determined, the action can be executed at the vehicle computing device 140. In this way, despite the vehicle computing device 140 corresponding to the second version, which is outdated relative to the third version, the automated assistant and/or the vehicle computing device 140 can still remain responsive to the requested intent, without wasting computational resources.

FIG. 1C illustrates a view 150 of a user providing a spoken utterance 152 to a vehicle computing device 156 of a vehicle 154 that corresponds to a first version that is supported by a server device 114. Specifically, FIG. 1C illustrates a scenario in which the server device 114 causes the vehicle computing device 156 to be responsive to the user, despite a requested intent being associated with actions of a first, and most recent, version. Furthermore, FIG. 1C illustrates how the server device 114 can provide instructional data, which can cause the vehicle computing device 156 to subsequently bypass transmitting certain data that corresponds to certain intent requests.

According to FIG. 1C, the user can provide a spoken utterance 152 such as, "Assistant, send my location and estimated arrival time to my destinations phone number." As discussed with respect to FIG. 1A and FIG. 1B, the aforementioned spoken utterance can be completely supported by the server device 114 or partially supported by the server device 114. However, in some situations, the server device 114 can determine, using the version engine 120 and version data 116, that the server device 114 no longer supports one or more requested intents. As an example, in response to receiving audio data characterizing the spoken utterance 152, the server device 114 can determine that the vehicle computing device 156 corresponds to the first version, and identify one or more intents requested by the user via the spoken utterance 152. If an identified intent corresponds to intent that is no longer supported by the most recent version (e.g., the third version), the server device 114 can further determine whether the vehicle computing device 156 has received instructional data regarding limiting an ability to submit such requests to the server device 114. Alternatively, or additionally, the vehicle computing device 156 can transmit, via a network 158, audio data, version data, and/or data characterizing a limitation of the vehicle computing device 156 with respect to certain intents. In response to receiving the limitation data, the server device 114 can determine an extent to which the server device 114 should and/or will be responsive to the data from the vehicle computing device 156.

For example, in response to receiving audio data, data, and a data characterizing the limitation, the server device 114 can determine that the vehicle computing device 156 is operating according to the first version, and that the vehicle computing device 156 has been instructed to no longer request intent data, action data, and/or slot data for one or more intents and/or one or more actions. The server device 114 can process the audio data in order to generate natural language understanding data, which can characterize one or more intents requested by the user. If the one or more characterized intents correspond to one or more intents identified by the limitation data, the server device 114 can bypass generating intent data, action data, and/or slot data for the vehicle computing device 156, at least with respect to the one or more characterized intents. Furthermore, instead of the server device 114 using resources on generating intent data, action data, and/or slot data, the server device 114 can generate speech-to-text data. Depending on processing capabilities of the local vehicle computing device 156, and/or how many applications are simultaneously running at the vehicle computing device 156, being provided the speech to text data from the server device 114 can preserve processing bandwidth at the vehicle computing device 156.

In some implementations, if the server device 114 determines that the version corresponding to the vehicle computing device 156 is subject to phasing-out, but has not been provided instructional data, the server device 114 can transmit data 160 to the vehicle computing device 156, and the data 160 can include the speech-to-text data and/or the instructional data characterizing limitations for the particular version associated with the vehicle computing device 156. In response to receiving the instructional data, the vehicle computing device 156 can update its configuration such as to cause it to subsequently bypass relying on, and/or querying, the server device 114 for certain intent data, action data, and/or slot data.

In situations in which the server device 114 acknowledges the limitations of the version of the vehicle computing device 156, and the server device 114 provides the speech-to-text data, the vehicle computing device 156 can use the speech to text data, or locally generated speech to text data, in furtherance of responding to the user, and/or otherwise fulfilling the requested intent. For example, the vehicle computing device 156 can determine, based on the speech to text data, that the user has requested a particular intent. Furthermore, because the server device 114 did not select a specific action for the intent, the vehicle computing device 156 can locally generate an action, such as a NEW_MESSAGE action. Furthermore, vehicle computing device 156 can determine whether one or more slots required for the NEW_MESSAGE action have been assigned slot values. If, for example a "MESSAGE_BODY( )" slot value is missing, or otherwise not identifiable by the vehicle computing device 156 using the speech to text data, the vehicle computing device 156 can provide a query 162 to the user. In response, the vehicle computing device 156 can provide a natural language output such as, "OK, what would you like the message to say?" Subsequently, the user can provide another spoken utterance 152 such as, "I'm on my way." This interaction between the user and the vehicle computing device 156 can continue until all required slots have been assigned slot values and/or until the action has been performed via the vehicle device 156. In this way, despite the vehicle computing device 156 corresponding to the first version, or otherwise a version that is not a most recent version, the vehicle computing device 156 can at least be responsive to the user and leverage certain functionality of the server device 114. This allows the vehicle computing device 156 to be responsive to users for longer periods of use, while also eliminating wasteful network communications and/or inefficient use of computational resources, such as memory and/or processing bandwidth.

Figure 2:
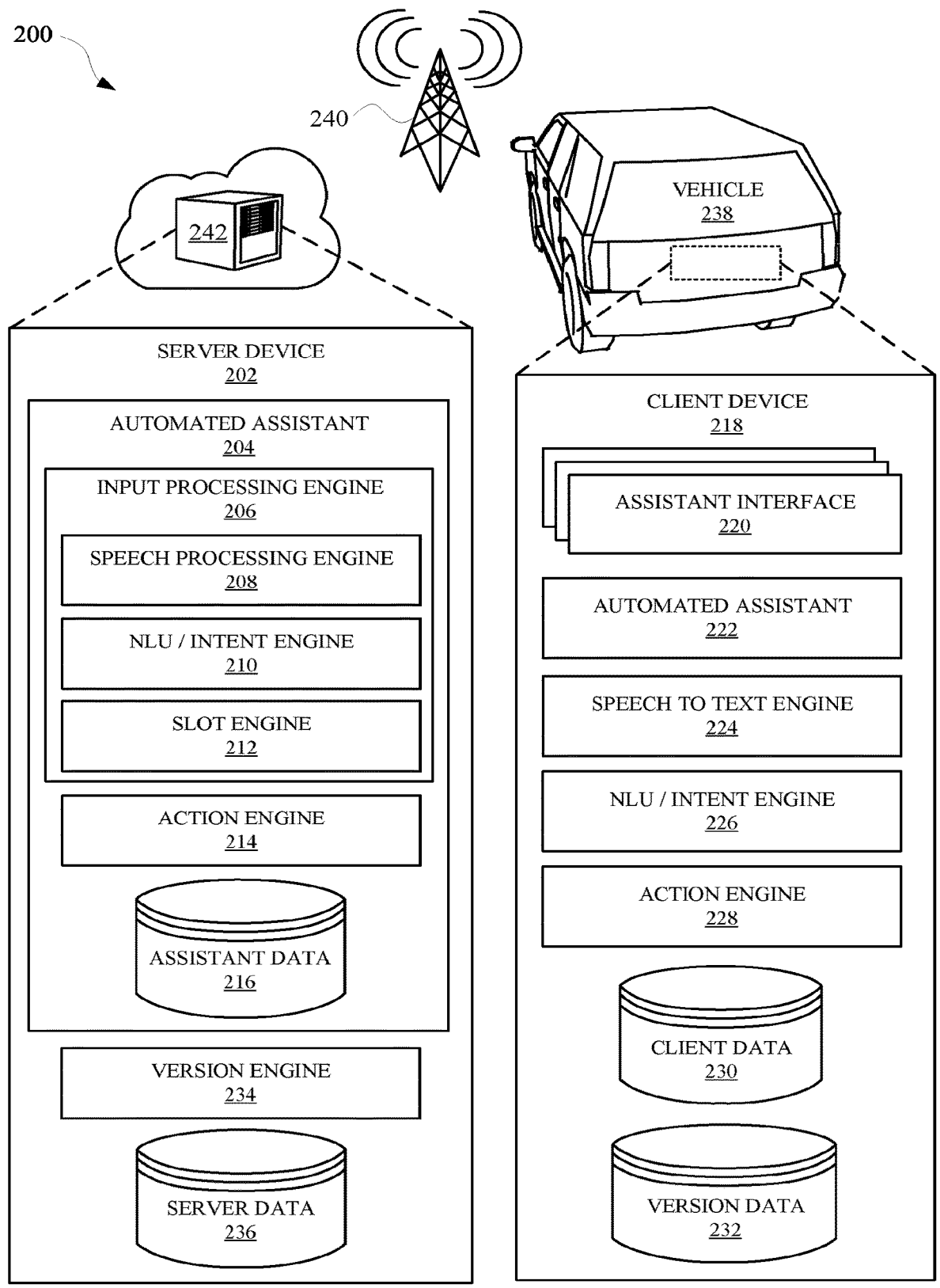
FIG. 2 illustrates a system for phasing-out support of computing device versions while ensuring useful responsiveness of any computing device versions that are still in use by a user.

FIG. 2 illustrates a system 200 for phasing-out of computing device (e.g., a vehicle computing device and/or any other client device) versions while ensuring useful responsiveness of any computing device versions that are still in operation. The automated assistant 204 can operate as part of an automated assistant application that is provided at one or more computing devices, such as a client device 218, and/or a server device 202. A user can interact with the automated assistant 204 via one or more assistant interfaces 220, which can include one or more of a microphone, a camera, a touch screen display, a user interface, and/or any other apparatus capable of providing an interface between a user and an application. For instance, a user can initialize the automated assistant 204 by providing a verbal, textual, or a graphical input to the assistant interface to cause the automated assistant 204 to perform a function (e.g., provide data, control a peripheral device, access an agent, etc.). The client device 218 can include a display device, which can be a display panel that includes a touch interface for receiving touch inputs and/or gestures for allowing a user to control applications of the client device 218 and/or the server device 202 via the touch interface.

In some implementations, the client device 218 can lack a display device but include an audio interface (e.g., a speaker and/or a microphone), thereby providing an audible user interface output, without providing a graphical user interface output, as well as providing a user interface, such as a microphone, for receiving spoken natural language inputs from a user. For instance, in some implementations, the client device 218 can include one or more tactile input interfaces, such as one or more buttons, and omit a display panel that is provided graphical data from a graphics processing unit (GPU). In this way, substantial energy and processing resources can be saved compared to a computing device that includes a display panel and GPU.

The client device 218 can be in communication with the server device 202 over a network 240, such as the internet. The client device 218 can offload computational tasks to the server device 202 in order to preserve computational resources at client device 218. For instance, the server device 202 can host an automated assistant 204, and the client device 218 can transmit inputs received at one or more assistant interfaces 220 to the server device 202. However, in some implementations, the automated assistant 204 can be hosted at the client device 218. In various implementations, all or less than all aspects of the automated assistant 204 can be implemented on remote computing device 242 and/or the client device 218. In some of those implementations, aspects of the automated assistant 204 are implemented via a local automated assistant 222 of the client device 218 and interface with the server device 202, which can implement other aspects of the automated assistant 204. The server device 202 can optionally serve a plurality of users and their associated assistant applications via multiple threads. In implementations where all or less than all aspects of the automated assistant 204 are implemented via a local automated assistant 222 of the client device 218, the local automated assistant 222 can be an application that is separate from an operating system of the client device 218 (e.g., installed "on top" of the operating system)—or can alternatively be implemented directly by the operating system of the client device 218 (e.g., considered an application of, but integral with, the operating system).

In some implementations, the automated assistant 204 and/or automated assistant 222 can include an input processing engine 206, which can employ multiple different modules for processing inputs and/or outputs for the client device 218. For instance, the input processing engine 206 can include a speech processing engine 208 that can process audio data received at an assistant interface 220 to identify the text embodied in the audio data. The audio data can be transmitted from, for example, the client device 218 to the server device 202 in order to preserve computational resources at the client device 218.

The process for converting the audio data to text can include a speech recognition algorithm, which can employ neural networks, and/or statistical models for identifying groups of audio data corresponding to words or phrases. The text converted from the audio data can be parsed by a natural language understanding (NLU)/intent engine 210 and made available to the automated assistant 204 as data that can be used to identify one or more intents requested by the user. In some implementations, output data provided by the NLU/intent engine 210 can be provided to an action engine 214 to determine whether the user has provided an input that corresponds to a particular action and/or routine capable of being performed by the automated assistant 204 and/or an application or agent that is capable of being accessed by the automated assistant 204. For example, assistant data 216 can be stored at the server device 202 and/or the client device 218, as client data 230, and can include data that defines one or more actions capable of being performed by the automated assistant 204, and/or automated assistant 222, as well as any slot values and/or other parameters involved in performing those actions.

When the input processing engine 206 has determined that a user has requested a particular intent, routine, and/or action be fulfilled and/or otherwise performed, a slot engine 212 can determine one or more slot values for slots of the particular intent and/or action, and the action engine 214 can then provide an output to the user based on the particular intent, action, routine, and/or the one or more slot values. For instance, in some implementations, in response to a user input, such as a gesture directed at the assistant interface 220 of client device 218 of vehicle 238, the automated assistant 222 can cause data, which characterizes the gesture, to be transmitted to the server device 202, allowing the server device to determine the intent and/or action that the user is intending the automated assistant 204 and/or automated assistant 222 to perform.

In some implementations, the client device 218 can be, but is not limited to, a desktop computer, a laptop computer, a portable computing device such as a cellular phone, a tablet computing device, a smart home device, and/or any other device that can be in direct or indirect communication with a server device. The client device 218 can correspond to a particular version, which can change overtime. For example, the client device 218 can correspond to a most recent version for receiving support from the server device 202, or the client device 218 can correspond to a version that is not the most recent version for receiving support from the server device 202. The version can correspond to one or more physical hardware components of the client device 218, an operating system of the client device 218, one or more applications available at the client device 218, the automated assistant 222, and/or any other apparatus or module that can be associated with the client device 218.

In order for the server device 202 to phase out supporting particular versions, the server device 202 can include a version engine 234, from which the server device 202 can determine limitations on support for particular versions. For example, using the version engine 234 and/or server data 236, the server device 202 can determine that the client device 218 corresponds to a version that is completely supported by the server device 202. In other words, a version can be completely supported when there is no limitation on being responsive to certain intent requests from the client device 218, at least relative to other versions.

As an example, when the client device 218 corresponds to a version that is completely supported, and a user provides the spoken utterance to an assistant interface 220 of the client device 218 for a particular intent, the server device 202 can be tasked with characterizing the intent, generating a suitable action and optionally, slot values, which can be used by the client device 218 to fulfill the particular intent. Alternatively, when the client device 218 corresponds to a version that is partially supported, and the user provides a spoken occurrence to the assistant interface 220 for that particular intent, the server device 202 can be tasked with characterizing the intent and optionally, generating slot values. Resulting data characterizing the intent and/or slot values can then be provided back to the client device 218, which can employ an action engine 228 to generate an action that corresponds to the particular intent, and is also supported by the version of the client device 218.

In some implementations, the version engine 234 can determine that the client device 218 corresponds to a version that is no longer supported by the server device 202. For example, in response to receiving a spoken utterance from the user at an assistant interface 220, the client device 218 can transmit audio data, corresponding to the spoken utterance, and version data 232 to the server device 202. Version data 232 stored at the client device 218 can indicate one or more versions corresponding to the client device 218, and/or one or more limitations that have been set forth by one or more server devices. A limitation can include, but is not limited to, instructions for the client device 218 to not rely on the server device 202 to provide intent data, action data, slot data, and/or any other data corresponding to certain requests from the user. Using the version data, the server device 202 can determine whether the client device 218 corresponds to a version that is completely supported, partially supported, or no longer supported by the server device 202.

When the client device 218 corresponds to a version that is no longer supported about the server device 202, the server device 202 can process the audio data received from the client device 218, and provide textual data, which characterizes natural language content of the spoken utterance, back to the client device 218. Therefore, intent, action, and/or slot value support would not be provided do the client device 219, but rather, a speech to text service can still be available to the client device 218 when a network connection between the client device 218 and the remote computing device 242 is available. This can eliminate wasteful processing at the client device 218, which may have less memory than the server device 202. For example, when the client device 218 corresponds to a rather old version of hardware, and therefore only includes 200 MB of RAM, but the server device 202 includes 8 GB of RAM, the server device 202 will be able to complete speech to text processing on the audio data in less time than the client device 218 can perform the speech to text processing. As a result, while the client device 218 is employing a speech-to-text engine 224 to convert audio data to textual data, the client device 218 can receive resulting textual data from the server device 202. The client device 218 can then elect to terminate the ongoing local speech to text processing, at least because of the textual data generated by the server device 202 eliminating the need for the client device 218 to generate such data.

In some implementations, a client device 218 corresponding to a version that is partially supported by the server device 202 can process audio data for a spoken utterance locally, and also transmit the audio data to the server device 202 for processing. Local processing with the audio data can be performed by an NLU/intent engine 226 capable of generating natural language understanding (NLU) data from textual data characterizing natural language content of the spoken utterance. The natural language understanding data can characterize one or more requested intents. Should the server device 202 generate the natural language understanding data in a shorter time period than the client device 218, the client device 218 can rely on the server device 202 for the natural language understanding data. However, thereafter, the client device 218 can cause the action engine 228 to process the natural language understanding data from the server device 202, at least in order to generate a suitable action that can be performed by that version of the client device 218. Version data can characterize one or more characteristics of one more hardware components, one or more software components, and/or any other feature of a client device. For example, in some implementations, version data can characterize one or more operating specifications of the client device. Alternatively, or additionally, version data can characterize one or more operating specifications of an application and/or operating system of the client device 218. Alternatively, or additionally, the version data can be specified by a manufacturer of the client device 218, a component of a client device, and/or a software manufacturer of an application or operating system of the client device 218. In some implementations, version data can characterize an account and/or subscription tier corresponding to one or more users. For instance, the version data can characterize one or more devices as corresponding to one or more account tiers (e.g., complete membership and/or full service tier), and other version data can characterize one or more other devices as corresponding to one or more other account tiers (e.g., limited membership and/or limited service tier).

Figure 3:
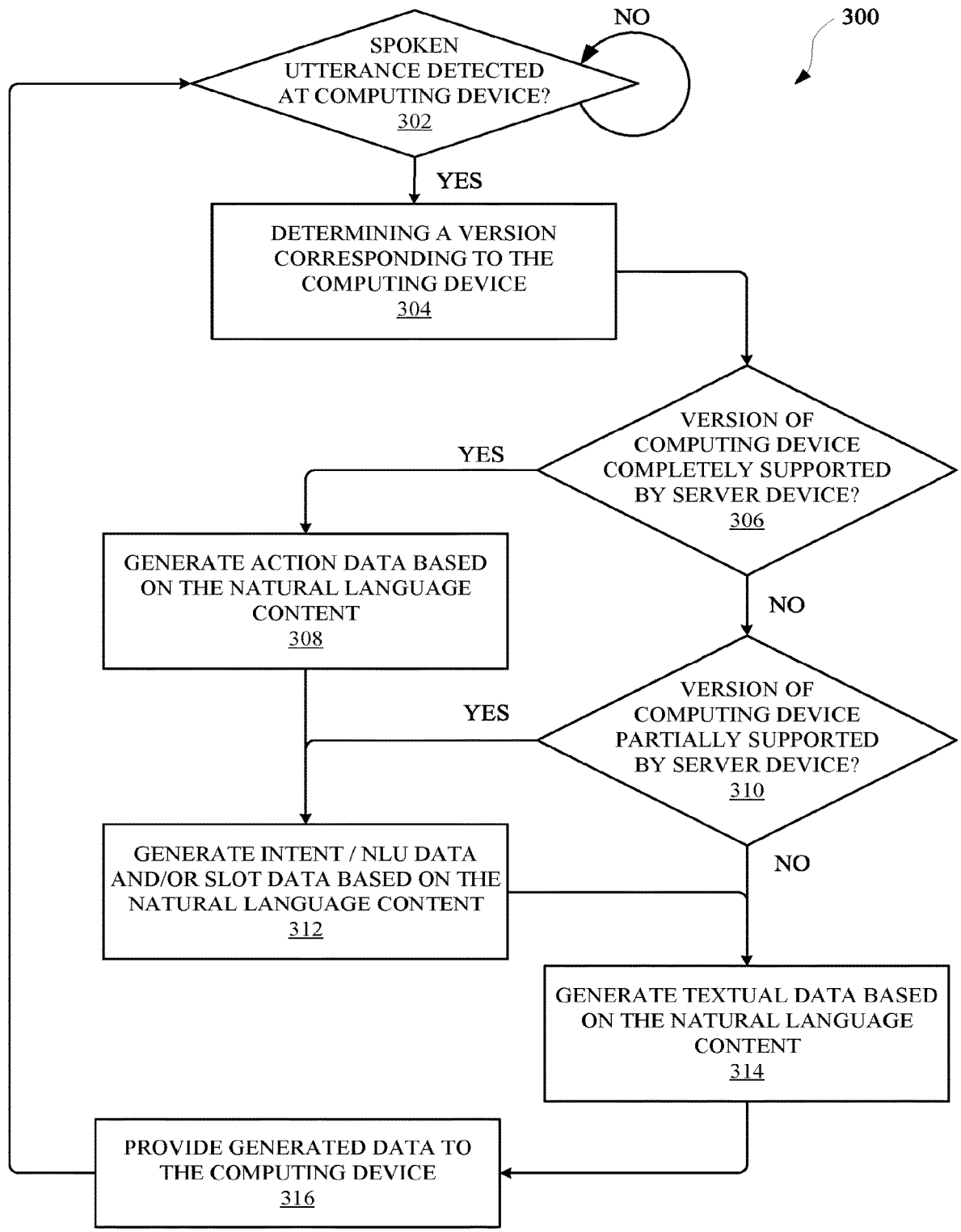
FIG. 3 illustrates a method for phasing-out support of certain computing device versions while ensuring useful responsiveness of any computing device versions that are still in operation.

FIG. 3 illustrates a method 300 for phasing-out support of certain computing device versions while ensuring useful responsiveness of any computing device versions that are still in operation. The method 300 can be performed by one or more computing devices, applications, and/or any other apparatus or module that can be associated with an automated assistant. The method 300 can include an operation 302 determining whether a spoken utterance has been detected at a computing device. The computing device can be, but is not limited to, a vehicle computing device, a mobile computing device, a desktop computing device, a cellular device, a server device, and/or any other apparatus capable of operating as a computing device. The spoken utterance can be a spoken natural language input from a user of the computing device. The spoken utterance can be, for example, "Assistant, stream music."

The method 300 can proceed from the operation 302 to an operation 304, which can include determining a version corresponding to the computing device. Alternatively, if no spoken utterance is detected, the operation 302 can repeat until a spoken utterance is detected at the computing device. However, regarding operation 304, the version corresponding to the computing device can be a version for the entire computing device, one or more hardware components of the computing device, one or more software components of the computing device, and/or any other feature of the computing device that can be characterized by a version. For example, the computing device can operate a local automated assistant, which can correspond to a particular version. Therefore, the local automated assistant can respond differently according to the version have the local automated assistant. Similarly, the entire computing device can respond differently according to the particular version that corresponds to the entire computing device, which can optionally be integral to a vehicle.

The method 300 can proceed from the operation 304 to the operation 306, which can include determining whether the version of the computing device is completely supported by a server device. The operation 306 can be performed by the server device, which can receive version data from the computing device, or otherwise access version data in response to determining that the spoken utterance was detected at the computing device. When the version corresponding to the computing device is determined to be completely supported by the server device, the method 300 can proceed to an operation 308. Alternatively, when the version corresponding to the computing device is determined to not be completely supported by the server device, the method 300 can proceed to an operation 310.

The operation 308 can include generating action data based on the natural language content of the spoken utterance. The action data can characterize one or more actions that are capable of being performed by the particular version of a computing device, and also currently supported by the server device. For example, at least corresponding to the aforementioned example (e.g., "Assistant, stream music."), the action data can generate a STREAM_MUSIC action, which can correspond to a PLAY_MUSIC intent.

The operation 310 can include determining whether the version corresponding to the computing device is at least partially supported by the server device. When the version of corresponding to the computing device is determined to at least be partially supported by the server device, the method 300 can proceed to an operation 312. The operation 312 can include generating the intent/NLU data and/or slot data based on the natural language content. The intent/NLU data can characterize the intent requested by the user via the spoken utterance, and the slot data can characterize one or more slot values, which can be used when the computing device is performing one or more actions. For example, if the user had specified an artist to play in their spoken utterance, the slot data could characterize the artist name. In this way, despite the server device not completely supporting the version corresponding to the computing device, the server device can nonetheless provide useful information to the computing device, in order to eliminate waste of computational resources at the computing device.

When the version corresponding to the computing device is not at least partially supported by the server device, the method 300 can proceed to an operation 314. The operation 314 can include generating textual data based on the natural language content of the spoken utterance. Because the computing device may have limited processing bandwidth and/or memory, at least relative to the server device, computational resources of the computing device can nonetheless be preserved by relying on the server device at least for speech to text processing. It should be noted that when the version corresponding to the computing device is completely supported by the server device, the operation 308, the operation 312, and/or the operation 314 can be performed by the server device for that particular version. Furthermore, when the version corresponding to the computing device is determined to be at least partially supported by the server device, the operation 312 and/or the operation 314 can be performed by the server device for that particular version.

The method 300 can proceed from the operation 314 to the operation 316 for providing generated data to the computing device. The generated data can correspond to the action data, the intent/NLU data, the slot data, and/or the textual data, depending on an extent to which the server device supports the version corresponding to the computing device. Therefore, although the server device may not completely or partially support a particular version, the server device can nonetheless provide some amount of data that will assist the computing device in processing the spoken utterance from the user. When the server device no longer supports the version corresponding to the computing device, the computing device can use the speech-to-text data provided from the server device to locally select one of our actions for fulfilling the request from the user. For example, with respect to the aforementioned example, when the server device does not completely or partially support the version corresponding to the computing device, the server device can provide textual data characterizing the natural language content of the spoken utterance (e.g., "STT_DATA('Assistant, stream music')"). In response, the computing device can determine the intent requested by the user (e.g., "PLAY_MUSIC"), and select an action that is available via the computing device (e.g., "SHUFFLE_MUSIC( )". In this way, wasteful communications between the server device and the computing device can be eliminated, while also providing responsiveness to the user. Such benefits can be realized despite the user not employing a computing device that corresponds to a version that is a most recent version, or even a version that is not at least partially supported by the server device. It should be noted that support by the server device can refer to intent specific support, but does not include intent agnostic support, such as speech to text processing, which can be performed by the server device regardless of the natural language content of the spoken utterance from the user.

Figure 4:
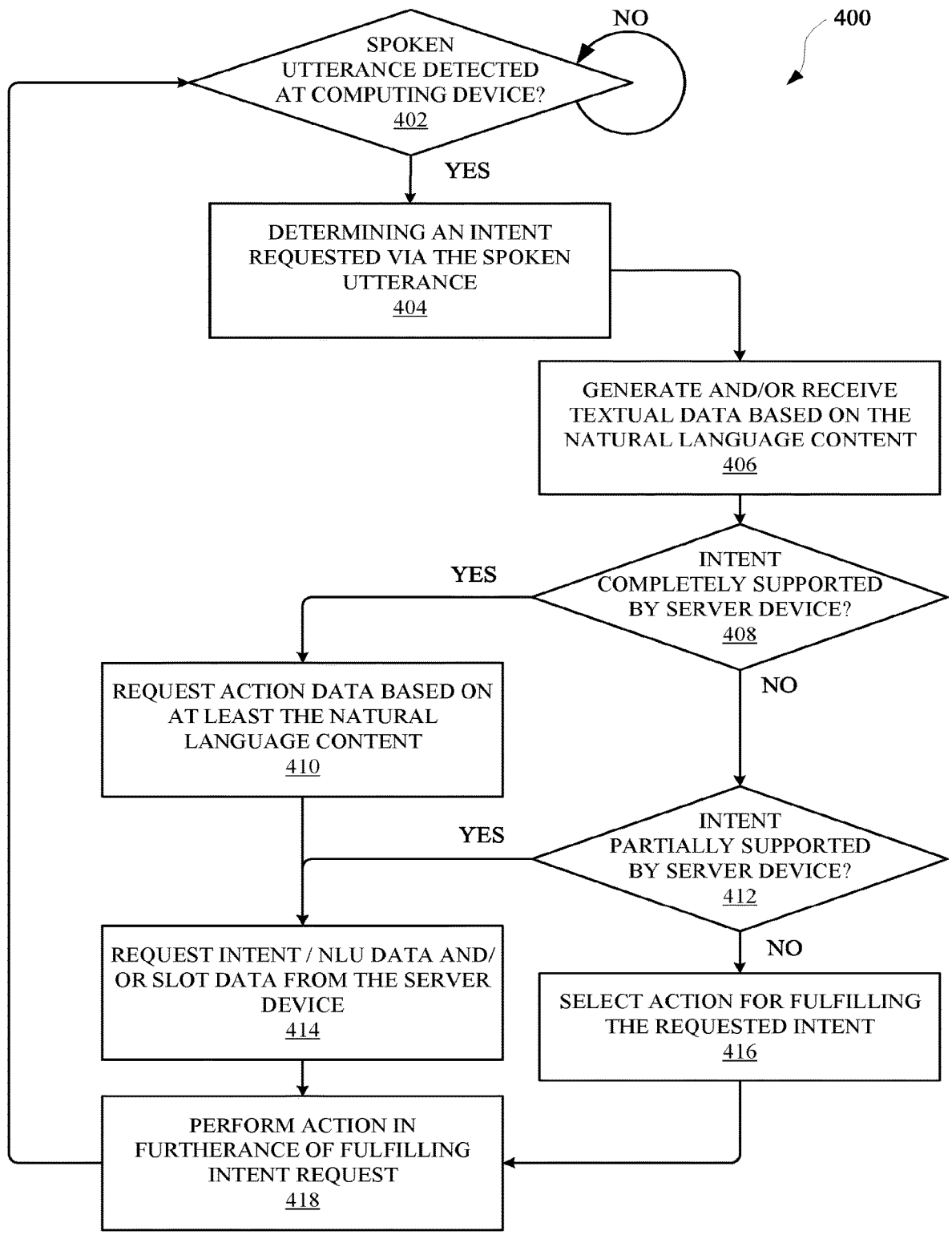

FIG. 4 illustrates a method 400 for phasing-out support for particular requests while ensuring useful responsiveness to any request a computing device has previously been responsive to. The method 400 can be performed by one or more computing devices, applications, and/or any other apparatus or module that can be associated with an automated assistant. The method 400 can include an operation 402 of determining whether a spoken utterance has been detected at a computing device. The computing device can be, but is not limited to, a vehicle computing device, a mobile computing device, a desktop computing device, a cellular device, a server device, and/or any other apparatus capable of operating as a computing device. The spoken utterance can be a spoken natural language input from a user of the computing device. As an example, the spoken utterance can include a request for the computing device to control a peripheral device, such as an IoT device (e.g., "Assistant, turn down the backlight of my smart TV.")

The method 400 can proceed from the operation 402 to the operation 404, which can include determining an intent requested via the spoken utterance. An intent can characterize a request from the user and/or can be associated with one or more different actions capable of being performed by a different respective computing device. For example, an intent corresponding to the spoken utterance, "Assistant, turn down the back light of my smart TV," can correspond to an intent such as, ADJUST_TV_SETTING intent. At least some versions corresponding to the computing device can support an action for an intent such as BACKLIGHT_ADJUST action, whereas other versions corresponding to the computing device will not support the BACKLIGHT_ADJUST action, but rather can execute a SETTING_ADJUST action.

The method 400 can proceed from the operation 404 to the operation 406, which can include generating and/or receiving text or data based on the natural language content. In some implementations, both the computing device and a server device can perform speech-to-text processing in response to the computing device detecting a spoken utterance. Specifically, the computing device can generate audio data in response to receiving the spoken utterance and provide the audio data to the server device, with permission from the user, and also process the audio data locally. If the server device is unresponsive to the provisioning of audio data, the computing device can locally process the audio data in order to generate textual data characterizing the natural language content of the spoken utterance. Contextual data, either received from the server device and/or from the computing device, can be further processed in order to identify one or more intents requested to be fulfilled.

The method 400 can proceed from the operation 408 to the operation 410, which can include determining whether one or more identified intents are completely supported by the server device. In some implementations, the operation 408 can include determining whether the computing device has been instructed to no longer request support for one or more intents that have been identified from the natural language content of the spoken utterance. When the computing device determines that the one or more intents are completely supported by the server device, or that the computing device has not been completely prevented from requesting support for the one or more intents, the method 400 can proceed from the operation 408, to the operation 410. Alternatively, when the computing device determines that the one or more intents are not at least partially supported by the server device, or that the computing device has been completely prevented from requesting support for the one or more intents, the method 400 can proceed from the operation 408 to the operation 412.

The operation 410 can include requesting action data based on the natural language content, and/or the one or more intents identified from the natural language content. For example, the computing device can identify the ADJUST_TV_SETTING intent, and in response to determining that the intent is completely supported by the server device given the version corresponding to the computing device, the computing device can request action data from the server device. For example, the action data can characterize the BACKLIGHT_ADJUST action, which can be executable by a most recent version, relative to other versions operating via other computing devices.

The method 400 can proceed from the operation 408 to the operation 412, which can include determining whether the one or more identified intents are partially supported by the server device. In some implementations, the operation 412 can include determining whether the computing device has been instructed to only request certain support for one or more intents that have been identified from the natural language content of the spoken utterance. When the computing device determines that the one or more intents are at least partially supported by the server device, or that the computing device has not been limited in the type of support for the one or more intents, the method 400 can proceed from the operation 412 to the operation 414. Alternatively, when the computing device determines that the one or more intents are not at least partially supported by the server device, or that the computing device has been limited in requesting support for the one or more intents, the method 400 can proceed from the operation 412 to the operation 416.

The operation 414 can include requesting intent/NLU data and/or slot data from the server device. The intent/NLU data and/or slot data can be used by the computing device in order to identify a particular function that remains executable via the version corresponding to the computing device. For example, the server device and/or the computing device can identify the intent ADJUST_TV_SETTING, and the server device can identify slot data for an action to be selected by the computing device. For example, the slot data can include a slot value such as, "backlight," at least based on the natural language content of the spoken utterance.

When the intent is determined to be no longer supported by the server device, at least for the version corresponding to the computing device, the method 400 can proceed from the operation 412 to the operation 416. The operation 416 include locally selecting an action for the filling the requested intent. For example, the computing device can determine that the server device previously provided instructions for completely limiting an ability of a computing device to request support for the ADJUST_TV_SETTING intent. Based on this determination, the computing device can locally select the action, SETTING_ADJUST( ), which, when executed, can cause a menu to appear at a TV in order to allow the user to make adjustments to settings of the TV.

In some implementations, the method 400 can proceed from the operation 410 to the operation 414, in order for the computing device to leverage the support from the server device. The method 400 can proceed from the operation 414 and/or the operation 416 to the operation 418. The operation 418 can include performing an action in furtherance of feeling the requested intent. When the action is identified locally at the computing device, the performance can include executing the locally selected action. When the action is identified by the server device, the performance can include executing the remotely selected action. In this way, regardless of whether the version corresponding the computing device is a most recent version or not a most recent version, the computing device will nonetheless be responsive to the spoken utterance from the user in a way that is useful to the user, while also eliminating waste of computational resources. For example, the remotely selected action can cause the BACKLIGHT_ADJUST action to be performed. Alternatively, the locally selected action computer can cause the SETTING_ACTION_ADJUST action to be performed, thereby causing a menu to appear at the TV, or another device. When the version is at least partially supported by the server device for the particular intent, and the server device provides slot data, the locally selected action can cause a menu to appear, and a sub-menu to appear that identifies the backlight adjustment portion of the menu. In this way, the partial support still allows the computing device to leverage computational processes of the server device despite the computing device not operating according to the most recent version.

Figure 5:
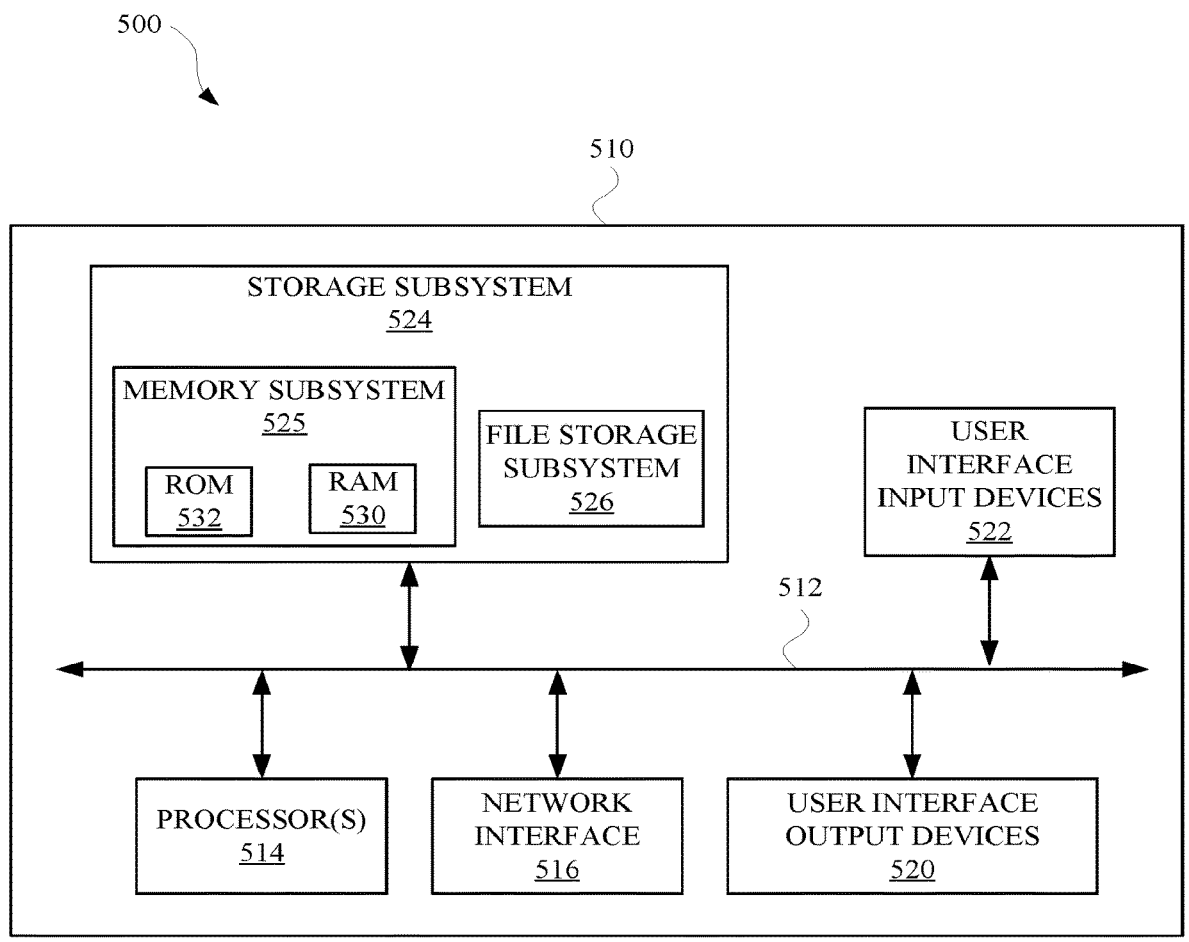
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRD), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or server device 114, vehicle computing device 106, vehicle 104, vehicle computing device 140, vehicle 134, remote computing device 112, vehicle computing device 156, vehicle 154, server device 202, client device 218, and/or any other apparatus, module, and/or engine discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

In some implementations, a method implemented by one or more processors is set forth as including operations such as determining, based on audio data being processed at a server device, that a user has provided a spoken utterance to an automated assistant interface of a vehicle computing device that is connected to a vehicle. The method can further include accessing, in response to determining that the user has provided the spoken utterance, version information associated with the vehicle computing device, wherein the version information indicates that the vehicle computing device corresponds to a particular version. The method can further include characterizing, based on processing the audio data, natural language content of the spoken utterance provided by the user. The method can further include determining, based on characterizing the natural language content of the spoken utterance, whether at least a portion of the natural language content is completely supported by the server device for the particular version. The method can further include, in response to determining that at least a portion of the natural language content is not completely supported by the server device for the particular version, at least based on the version information: providing, to the vehicle computing device, textual data characterizing the natural language content of the spoken utterance provided by the user, and causing the vehicle computing device to locally perform an action that is locally generated by the vehicle computing device based on the natural language content.

In some implementations, determining whether at least the portion of the natural language content is completely supported by the server device for the particular version includes: determining whether at least the portion of the natural language content includes one or more natural language terms corresponding to one or more intents that are indicated, at the server device, as not being completely supported by the server device. In some implementations the one or more intents are indicated, at the server device, as being completely supported for other vehicle computing device versions that do not include the particular version of the vehicle computing device. In some implementations, the textual data characterizes the portion of the natural language content that includes the one or more natural language terms. In some implementations, the method can further include, in response to determining that at least the portion of the natural language content is completely supported by the server device for the particular version: generating, at the server device, action data that identifies an intent requested by the user, and another action that is supported by the particular version of the vehicle computing device, and providing the action data to the vehicle computing device. In some implementations, providing the action data to the vehicle computing device causes the vehicle computing device to perform the other action using the provided action data.

In some implementations, the method can further include, in response to determining that at least the portion of the natural language content is not completely supported by the server device for the particular version, at least with respect to the version information: generating instructional data characterizing a limitation for the vehicle computing device with respect to a requested intent, and providing the instructional data to the vehicle computing device, wherein the instructional data causes the vehicle computing device to, in response to a subsequent user input, bypass requesting the server device to generate a particular action corresponding to another instance of the requested intent. In some implementations, the method can further include, in response to determining that at least the portion of the natural language content is not completely supported by the server device for the particular version, and subsequent to providing the instructional data to the vehicle computing device: determining that another spoken utterance associated with the requested intent was received at the automated assistant interface of the vehicle computing device, and providing other textual data to the vehicle computing device, wherein the other textual data characterizes other natural language content of the other spoken utterance and omits data characterizing a particular action for the requested intent.

In some implementations, the method can further include, in response to determining that at least the portion of the natural language content is partially supported by the server device for the particular version, at least with respect to the version information: providing, to the vehicle computing device, natural language understanding (NLU) data characterizing a particular intent requested by the user via the spoken utterance. In some implementations, the method can further include, in response to determining that at least the portion of the natural language content is partially supported by the server device for the particular version, at least with respect to the version information: providing, to the vehicle computing device, slot data characterizing one or more slot values for the particular intent, and causing the vehicle computing device to perform the action using the one or more slot values, wherein the action is locally identified by the vehicle computing device based on the particular intent and the slot values. In some implementations, the spoken utterance is associated with a hardware subsystem of the vehicle, and the spoken utterance is received at the automated assistant interface when the user is riding in, and/or driving, the vehicle. In some implementations, the method can further include determining, subsequent to determining that the user provided the spoken utterance, that another spoken utterance was received at a separate vehicle computing device that is operating according to the currently supported version; and providing, based on other natural language content of the other spoken utterance, NLU data characterizing a requested intent, slot data characterizing one or more slot values for the requested intent, and action data characterizing a separate action to be performed by the separate vehicle computing device.

In some implementations, the method can further include, prior to determining that the user provided the spoken utterance, determining that the particular version, which was previously completely supported by the server device in communication with the vehicle computing device, is completely supported by the server device. In some implementations, determining whether at least the portion of the natural language content is completely supported by the particular version includes determining an extent to which the particular version is supported by the server device.

In yet other implementations, a method implemented by one or more processors is set forth as including operations such as determining that natural language content embodied in a spoken utterance, received at a first vehicle computing device, corresponds to a first intent request. The method can further include determining, based on determining that the natural language content corresponds to the first intent request, an extent to which the first intent request is supported by a server device for a version corresponding to the first vehicle computing device. The method can further include generating, based on the extent to which the first intent request is supported by the server device, first data that characterizes an intent requested by the user. The method can further include determining that other natural language content embodied in another spoken utterance, received at a second vehicle computing device, corresponds to a second intent request. The method can further include determining, based on determining that the other natural language content includes the second intent request, another extent to which the second intent request is supported by the server device for another version corresponding to the second vehicle computing device, wherein the version is different than the other version. The method can further include generating, based on the other extent to which the second intent request is supported by the server device, second data characterizing the other natural language content of the other spoken utterance. The method can further include providing, to the first vehicle computing device, the first data in furtherance of causing the first vehicle computing device to fulfill the first intent request; and providing, to the second vehicle computing device, the second data in furtherance of causing the second vehicle computing device to fulfill the second intent request. In some implementations, the other version corresponding to the second vehicle computing device was initially supported by the server device subsequent to a time when the version corresponding to the first vehicle computing device was initially supported by the server device.

In some implementations, the first intent request and the second intent request correspond to a type of vehicle hardware device, and wherein the first data further characterizes an action corresponding to the intent and an operation capable of being performed by the type of vehicle hardware intent. In some implementations, in response to the second vehicle computing device receiving the second data, the second data causes the type of vehicle hardware device to perform the operation and/or a different operation. In some implementations, the type of vehicle hardware device includes one or more sensors, one or more other computing devices, and/or one or more electromechanical devices.

In yet other implementations, a method implemented by one or more processors is set forth as including operations such as receiving, via an interface in communication with a vehicle computing device of a vehicle, data that characterizes a spoken utterance provided by a user to the interface, wherein the spoken utterance corresponds to a request for the vehicle computing device to fulfill a particular intent. The method can further include determining, at least based on the data that characterizes the spoken utterance provided by the user, natural language content of the spoken utterance, wherein the natural language content includes one or more terms corresponding to the particular intent. The method can further include determining, at least based on the one or more terms of the natural language content and a version corresponding to the vehicle computing device, an extent to which the one or more terms are supported by a server device for the version. The method can further include, in response to determining that the one or more terms of the natural language content are completely supported by the server device for the version: providing a request, for action data, to the server device that is in communication with the vehicle computing device, and receiving, after the server device receives the request, the action data from the server device, and causing the vehicle computing device to perform an action characterized by the action data. The method can further include, in response to determining that the one or more terms of the natural language content are partially supported by the server device for the version: providing a different request for at least intent data from the server device, receiving, in response to the server device receiving the different request, the intent data from the server device, wherein the intent data characterizes the particular intent, and causing, based on the intent data, the vehicle computing device to perform a different action associated with the particular intent.

In some implementations, the action corresponds to an application and the different action corresponds to a different application. In some implementations, the action and the different action both correspond to a hardware subsystem of the vehicle. In some implementations, the method can further include, in response to determining that the one or more terms of the natural language content are no longer be supported by the server device for the version: providing a separate request for at least textual data from the server device, receiving, in response to the server device receiving the separate request, the textual data from the server device, wherein the textual data characterizes the natural language content of the spoken utterance, and causing, based on the textual data, the vehicle computing device to select a particular action for execution at the vehicle computing device.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:

determining that first natural language content embodied in a first spoken utterance, received at a first computing device, corresponds to a first intent request;

determining, based on determining that the first natural language content corresponds to the first intent request, a first extent to which the first intent request is supported for a first version corresponding to the first computing device;

generating, based on the first extent to which the first intent request is supported for the first version, first data that includes action data, for the first intent request, that is executable by the first computing device to fulfill the first intent request;

providing the first data to the first computing device,
wherein providing the first data to the first computing device causes the first computing device to fulfill the first intent request using the action data of the first data;

determining that the first natural language content is embodied in audio data that captures a second spoken utterance, received at a second computing device, corresponds to the first intent request;

determining, based on determining that second natural language content includes the first intent request, a second extent to which the first intent request is supported by the server device for a second version corresponding to the second computing device, wherein the second version is different than the first version, and wherein the second extent is a lesser extent than the first extent;

generating, based on the second extent to which the second intent request is supported by the server device, second data that excludes the action data but that includes speech-to-text data that is generated by the server device based on performing speech-to-text processing of the audio data that captures the second spoken utterance; and providing the second data to the second computing device,
wherein providing the second data to the second computing device causes the second computing device to locally perform an action that is locally generated by the second computing device based on the speech-to-text data of the second data.

2. The method of claim 1, wherein the first computing device executes the action data to perform an alternative action that differs from the action that is locally generated by the second computing device.

3. The method of claim 2, wherein performing the alternative action includes utilizing sensor output from one or more sensors of the first computing device, and wherein performing the second action is independent of utilizing any sensor output from any sensors of the second computing device.

4. The method of claim 3, wherein the first computing device is a first vehicle computing device and the second computing device is a second vehicle computing device.

5. The method of claim 1, wherein the second computing device locally generates the action using a local natural language understanding (NLU) engine and a local action engine.

6. The method of claim 1, wherein the second computing device locally generates the action using a local action engine.

7. The method of claim 1, further comprising:
receiving, from the second computing device, the audio data and second device version data; and
determining the second version based on the second device version data received from the second computing device.

8. A method implemented by one or more processors of a vehicle computing device of a vehicle, the method comprising:
transmitting, to a server, a first transmission that includes:
first audio data that is detected at the vehicle computing device and that captures an instance of a user speaking a particular request, and
version data that indicates a version of the vehicle computing device;
receiving, from the server and in response to the first transmission:
action data that is generated by the server device based on processing the first audio data, and that is generated by the server based on a determination, at the server, that the version data satisfies one or more conditions;
in response to receiving the action data from the server, executing the action data to perform an action to fulfill the particular request;
transmitting, to the server, a second transmission that includes:
second audio data that is based on second audio data detected at the vehicle computing device and that captures an additional instance of the user, or an additional user, speaking the particular request, and
the version data,
wherein the second transmission occurs subsequent to the first transmission;
receiving, from the server and in response to the second transmission:
data that includes speech-to-text data but lacks any action data, wherein the speech-to-text data is generated by the server by performing speech-to-text processing on the audio data, and wherein the data lacks any action data based on an additional determination, at the server, that the version data no longer satisfies the one or more conditions; and
in response to receiving the speech-to-text data from the server, using the speech-to-text data to locally generate a local action to fulfill the particular request,
wherein the local action differs from the action.

9. The method of claim 8, wherein executing the action data to perform the action includes utilizing sensor output from one or more sensors of the vehicle, and wherein the local action lacks utilization of any sensor output from any sensors of the vehicle.

10. The method of claim 8, wherein using the speech-to-text data to locally generate the local action comprises generating the action based on processing the speech-to-text data, using a local natural language understanding (NLU) engine, to generate NLU data.

11. The method of claim 10, wherein using the speech-to-text data to locally generate the local action further comprises generating the action based on processing the NLU data using a local action engine.

12. The method of claim 11, wherein executing the action data to perform the action includes utilizing sensor output from one or more sensors of the vehicle, and wherein the local action lacks utilization of any sensor output from any sensors of the vehicle.

* * * * *